3,280,354
HIGH ALTITUDE COMMUTATOR AND
BRUSH ASSEMBLY
Arnold J. Unger, Fullerton, Calif., assignor to Robertshaw-Controls Company, Richmond, Va., a corporation of Delaware
Filed May 31, 1963, Ser. No. 284,426
10 Claims. (Cl. 310—228)

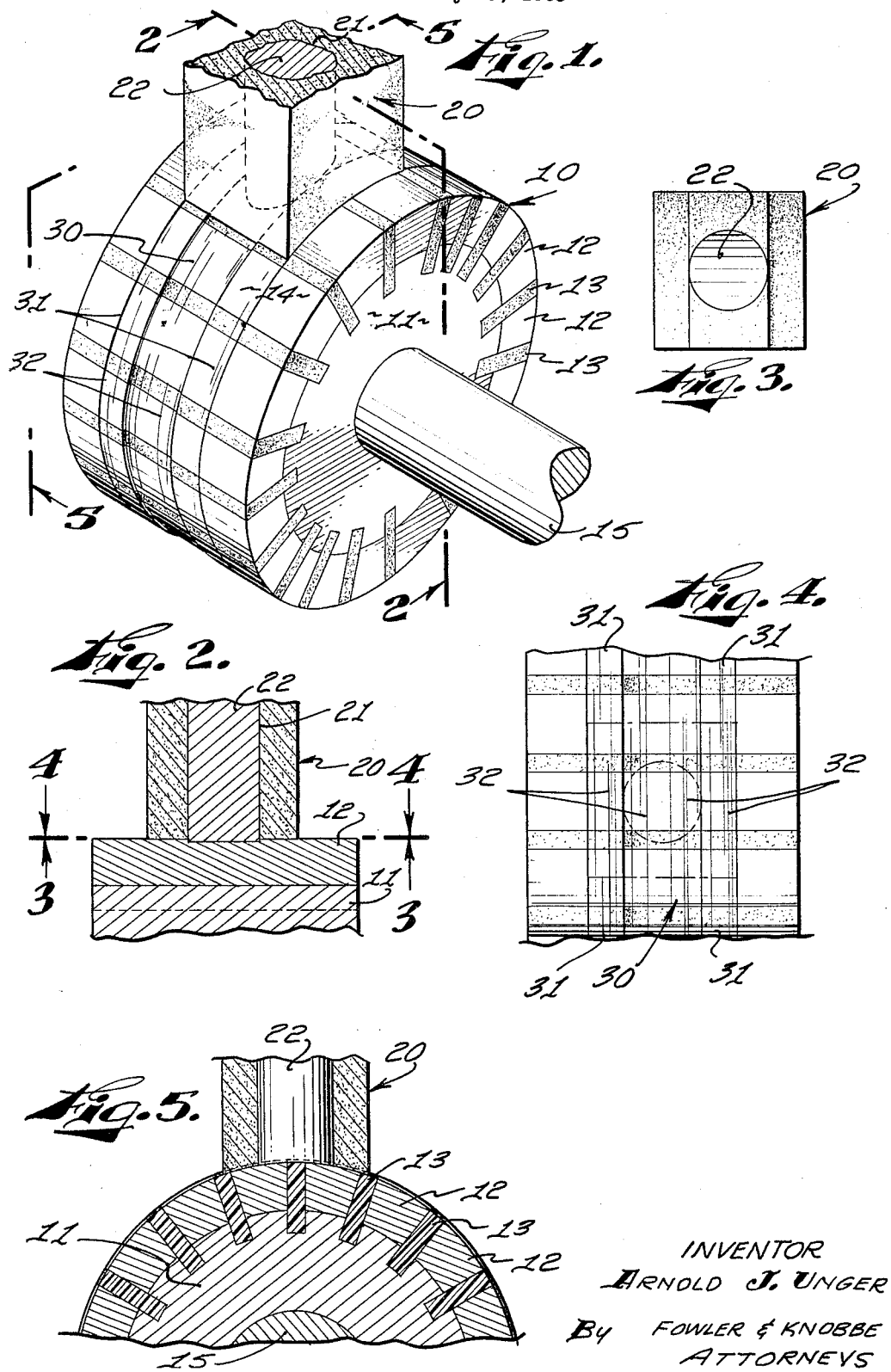

The present invention relates to an improved dynamoelectric machine and method of constructing same, and, more particularly, to a machine having minimal performance degradation when operated at high altitudes and in space.

Dynamoelectric machines known in the prior art have conventionally employed a commutator comprising a plurality of copper or copper alloy bars with open slots between the bars and a brush engaging the peripheral surface of the commutator. These brushes generally comprise either a homogeneous mixture of carbon or carbonaceous materials or a combination of carbon and a solid lubricant such as molybdenum disulfide. Representative examples of the latter type of brush are described in the following U.S. Patents: 2,870,353—Schobert II; 2,854,597—Foote et al.; 2,946,907—Titus; 2,981,-698—Arnold; 3,042,629—Smisko; 3,042,822—Savage et al.; and 3,046,425—Millet.

These prior art dynamoelectric machines have in general functioned satisfactorily at the altitudes flown by conventional aircraft. However, high altitude aircraft and space vehicles operate in a rarefied and dry atmosphere in which the lubricating water vapor and foreign air particles disappear. As a result, the friction between the brushes and commutator of the dynamoelectric machine increases and causes the brush to powder off excessively, the brush edges to chip, the commutator film to be wiped off and the temperature of the commutator brush assembly to increase excessively. In the past, this combination of deleterious effects and any high current densities have caused system failure.

It is an object of the present invention to provide an improved dynamoelectric machine which has greatly increased endurance capabilities at high altitudes and in space over the machines known in the prior art. More specifically, machines constructed in accordance with this invention are not subject to excessive brush wear or commutation temperatures, even for very high commutation current densities. Another feature of the invention is that the manufacturing techniques employed in constructing machines according to the invention are relatively simple and do not require extensive redesign of conventional dynamoelectric components.

Other and further objects, features and advantages of the invention will become apparent as the description proceeds.

Briefly, in accordance with a preferred form of the present invention, a dynamoelectric machine includes a commutator comprising a generally cylindrical body having a plurality of commutator segments arranged in circumferentially spaced apart relation around the commutator body. A high altitude and high temperature resistant dielectric plastic compound is located between each of the segments and machined flush therewith to provide a smooth peripheral commutation surface. This type of commutator is generally described in U.S. Patent No. 3,010,182—Quinalan. Hertofore, this type of commutator has not been widely used in airborne machines since a carbon brush tends to form a continuous carbon film over both the plastic and commutator bars causing a shorting effect and erratic operation. Otherwise, it has been apparent that this type of commutator has certain inherent advantages. Thus, the smooth peripheral commutator surface prevents bouncing of the brush and avoids chipping the edges of the brush by contact with raised segments of the commutator.

The present invention is based upon the discovery that a dynamoelectric machine having extremely high endurance capabilities in rarefied and dry atmospheres may be constructed by combining a commutator having a smooth peripheral commutation surface with an electrographitic carbon brush having an inserted core or cores of molybdenum disulfide. These motor components are assembled in the customary manner with the brush engaged with the peripheral surface of the commutator. The machine is then operated under low altitude conditions for several hours to form a very shallow track on the commutator surface the width of the molybdenum disulfide core and containing micro-grooves matching those in the brushes. A film is also formed upon the surface of the commutator, this film presumably being primarily composed of particles of carbon and molybdenum disulfide. At the conclusion of this operation, any brush dust in the commutator-brush area is blown out with compressed air. The unit, however, is not disassembled, thereby avoiding disturbing the position of the brush relative to the commutator.

It has been discovered that dynamoelectric machines constructed in this manner have unexpectedly high endurance capabilities when subjected to operation under very high altitude conditions. In comparative tests between a prior art motor and a motor constructed in accordance with the present invention, wherein each motor was alternately started and stopped bidirectionally in a rarefied and dry atmosphere, the prior art motor showed excessive wear after a total number of twenty-nine actuations whereas the motor constructed in accordance with this invention showed no signs of wear after more than five hundred actuations. All of the reasons for this improved operation are not presently known, but the reduction of friction and heating and the prevention of breakup of the brush surface contribute to the improved results. Whatever the reasons, however, the dynamoelectric machines of this invention have much greater high altitude capabilities than would be expected from adding the individual performance specifications of the commutator and brush.

A more thorough understanding of the invention may be obtained by a study of the following detailed description taken in connection with the accompanying drawings in which:

FIG. 1 is a perspective view of the commutator and brush assembly of a dynamoelectric machine constructed in accordance with the invention;

FIG. 2 is a cross-sectional view taken along the line 2—2 of FIG. 1;

FIGS. 3 and 4 are plan views of the brushes and commutator surfaces respectively;

FIG. 5 is a cross-sectional view taken along the line 5—5 of FIG. 1.

Dynamoelectric machines constructed in accordance with the invention include a commutator 10 having a smooth peripheral surface. A preferred embodiment of the commutator is shown in the figures wherein an inner plastic core 11 has embedded therein a plurality of commutator segments 12 comprising copper or copper alloy bars. These bars are arranged in circumferentially spaced apart relation around the core 11. The space between each bar is filled with a high temperature and high altitude resistant dielectric plastic compound 13. A preferred material is a thermosetting epoxy resin in which the resin is mixed with an amine catalyst. By way of specific example, reference is made to Miracle Adhesive 185 which is manufactured and sold by the Miracle Adhesive Corporation, Bellmore, Long Island, New York. This specific material remains hard at 550° F. The outer surface of the plastic is then machined to the outside diameter of the commutator bars to provide the desired smooth peripheral surface 14. The resulting commutator is rotatably mounted upon shaft 15 in a dynamoelectric structure in the usual manner.

The peripheral surface 14 of the commutator is engaged by one or more brushes 20 substantially composed of electrographitic carbon and having an inner core 21 filled with a material 22 composed of molybdenum disulfide. Preferably, a single cylindrical core is formed as shown in the figures and occupies half or more of the surface of the brush (FIG. 3).

The commutator 10 and brushes 20 are then assembled in a dynamoelectric structure and the brush tension adjusted for optimum performance. The assembled machine is then run in under low altitude conditions, i.e. on the earth's surface, for a period of several hours until a circumferential groove 30 is formed on the peripheral surface of the commutator. This groove is the width of the molybdenum disulfide core 22. By way of specific example, a groove 30 approximately 0.005 inch deep is formed after a run in period of 24 hours at approximately 500 feet per minute peripheral velocity. A film is also formed upon the surface of the commutator, this film presumably being primarily composed of particles of carbon and molybdenum disulfide.

A substantially shallower groove 31 is formed on either side of groove 30, groove 31 extending to the edges of the brush 20. By way of specific example, the 24 hour run in at 500 feet per minute peripheral velocity provides a track 31 which is approximately 0.001 inch in depth. Both of the grooves 30 and 31 will contain micro-grooves 32 matching those in the brushes.

After the run in operation, any brush dust in the commutator-brush area is blown out with compressed air. Preferably, the unit is not disassembled, thereby preventing any disturbance of the brush position relative to the commutator.

Dynamoelectric machines constructed in the manner described have been discovered to have extremely high operational capabilities in a rarefied and dry atmosphere. Specifically, their performance at high altitudes is substantially identical to that at sea level. Thus, motors constructed in accordance with this invention have minimal brush powdering, chipping and breaking when operated under these environmental conditions. The machines have also substantially reduced friction, thereby greatly reducing heating due to the friction itself and due to any insipient arcing. Substantial brush currents are readily achieved in machines of this invention, e.g., the temperature of the commutation system is not excessive even when brush current densities of 150 to 400 amperes per square inch are utilized. Another unexpected feature of the invention is that in some unknown manner, the continuous carbon film formed over both the plastic and commutator bars by the exposed carbon portion of the brush 20 does not cause a shorting effect and erratic motor operations. Still another feature of the invention is that the film and brush material applied to the surface of the commutator bars remains thereon even when operated in high vacuum environments.

By way of specific example, two split-series, wound field, 28 volt D.C. motors with intermittent duty ratings of 1/25 H.P. at 10,000 r.p.m. were tested under simulated orbital conditions (pressure of $2 \times 10^{-6}$ torr). One motor employed a conventional high altitude commutation system and the other was constructed in accordance with this invention. Each motor was operated with a rotation reversal each 10-second duty half cycle. The motor "on" time per half cycle was approximately 0.5 second with 0.85 seconds maximum. The conventional motor operated through only four complete cycles before a recording oscillograph indicated the beginning of degraded commutation whereas the motor constructed in accordance with this invention was cycled through fifty-two cycles without any reduction in commutation effectiveness or any signs of degraded commutation.

Although exemplary embodiments of the invention have been disclosed and discussed, it will be understood that other applications of the invention are possible and the embodiments disclosed may be subjected to various changes, modifications and substitutions without necessarily departing from the spirit of the invention.

I claim:
1. In a dynamoelectric machine having minimal performance degradation at high altitudes and in space, the combination of
 a commutator comprising
  a generally cylindrical member having a plurality of commutator segments arranged in circumferentially spaced apart relation around said member and
  a high altitude and high temperature resistant dielectric plastic compound between each of said segments and formed flush with the outer surface thereof to provide a smooth peripheral commutation surface,
 an electrographitic carbon brush having an inserted core of molybdenum disulfide engaging the peripheral surface of said commutator, and
  a first circumferential groove in the peripheral surface of said commutator, said groove having the width of the inserted molybdenum disulfide core and being formed by running the assembled commutator and brush for a period of several hours.

2. In the combination defined in claim 1,
 another circumferential groove on either side of said first groove having a width corresponding to the width of said brush, the depth of said second groove being substantially smaller than the depth of said first groove.

3. In a dynamoelectric machine having substantially the same performance in a rarefied and dry atmosphere as at sea level, the combination of
 a commutator comprising
  a generally cylindrical member having a plurality of commutator segments arranged in circumferentially spaced apart relation around said member and
  a high altitude and high temperature resistant dielectric plastic compound between each of said segments and flush with the outer surface thereof to provide a smooth peripheral commutation surface,
 a carbon brush having an inserted core of solid lubricant engaging the peripheral surface of said commutator, and
 a circumferential groove in the peripheral surface of said commutator, said groove having the width of the inserted core of solid lubricant and being formed by running the assembled commutator and brush for a period of several hours.

4. In the combination defined in claim 3
 said plastic compound comprising a thermosetting epoxy resin mixed with an amine catalyst, said material remaining hard at temperatures of the order of 550° F.

5. In a dynamoelectric machine having substantially the same performance in a rarefied and dry atmosphere as at sea level, the combination of
 a commutator comprising
  a generally cylindrical member having a plurality of commutator segments arranged in circumferentially spaced apart relation around said member and
  a high altitude and high temperature resistant dielectric plastic compound between each of said segments and flush with the outer surface thereof to provide a smooth peripheral commutation surface, said commutator having a first circumferential groove having a depth of the order of 0.005 inch formed in the peripheral surface of said commutator and a second circumferential groove having a depth of the order of 0.001 inch formed in peripheral surface of said commutator on either side of said first groove, and an electrographitic brush having an inserted core of molybdenum disulfide engaging the peripheral surface of said commutator, the width of said core corresponding to the width of said first groove and the width of said brush corresponding to the width of said second groove.

6. A method for constructing a dynamoelectric machine having minimal performance degradation at high altitudes and in space comprising the step of:

running in a machine including a commutator having a smooth peripheral surface and a brush having an inserted core of molybdenum disulfide at a low altitude until a shallow circumferential groove is formed in a peripheral surface of said commutator.

7. A method for obviating the shorting effect and erratic operation caused by a continuous carbon film which is formed when a commutator having a smooth peripheral commutation surface is used with a carbon brush comprising the step of:

running in for several hours an assembled machine including a brush having an inserted core of molybdenum disulfide.

8. A method for constructing a dynamoelectric machine having minimal performance degradation at high altitudes and in space comprising the step of:

running in an assembled machine including a commutator having a smooth peripheral surface and a brush having an inserted core of molybdenum disulfide until a first circumferential groove of the order of .005 inch in depth is formed in a peripheral surface of said commutator, said groove having a width corresponding to the width of said core.

9. A method for constructing a dynamoelectric machine having minimal performance degradation at high altitudes and in space comprising the step of:

running in an assembled machine including a commutator having a smooth peripheral surface and a brush having an inserted core of molybdenum disulfide until a first groove is formed in the peripheral surface of said commutator having the width of said molybdenum disulfide core and a second groove of shallower depth than said first groove is formed having a width corresponding to that of said brush.

10. A method for constructing a dynamoelectric machine having minimal performance degradation at high altitudes and in space comprising the step of:

running in an assembled machine including a commutator having a smooth peripheral surface and a brush having an inserted core of molybdenum disulfide until both a first circumferential groove having a depth of the order of .005 inch and a width corresponding to said molybdenum disulfide core and a second circumferential groove having a depth of the order of .001 inch and a width corresponding to the width of said brush are formed in the peripheral surface of said commutator.

References Cited by the Examiner

UNITED STATES PATENTS

| | | | |
|---|---|---|---|
| 2,946,907 | 7/1961 | Titus | 310—228 |
| 2,990,488 | 6/1961 | Schafer | 310—235 |
| 3,010,182 | 11/1961 | Quinlan | 29—155.54 |

MILTON O. HIRSHFIELD, *Primary Examiner.*

ORIS L. RADER, *Examiner.*

C. W. DAWSON, D. F. DUGGAN,
*Assistant Examiners.*